United States Patent [19]

Lamborn

[11] 3,783,671
[45] Jan. 8, 1974

[54] APPARATUS FOR SIZING JOINT RINGS FOR CYLINDRICAL PIPES
[75] Inventor: Homer C. Lamborn, Glendora, Calif.
[73] Assignee: Curwood, Inc., New London, Wis.
[22] Filed: Feb. 28, 1972
[21] Appl. No.: 229,907

[52] U.S. Cl. .................................. 72/392, 29/523
[51] Int. Cl. ............................................ B21d 41/02
[58] Field of Search .......................... 72/392, 393; 29/243.52, 523; 269/48.1

[56] References Cited
UNITED STATES PATENTS
| | | | |
|---|---|---|---|
| 3,466,920 | 9/1969 | Parker | 72/393 |
| 426,492 | 4/1890 | Debth | 72/392 |
| 2,474,887 | 7/1949 | Carswell et al. | 72/392 |
| 2,878,770 | 3/1959 | Work et al. | 269/48.1 |
| 608,715 | 8/1898 | Roman | 29/523 |
| 1,009,002 | 11/1911 | Welch | 29/523 |
| 3,677,058 | 7/1972 | VanGompel | 72/393 |
| 1,108,618 | 8/1914 | Pilston | 29/243.52 |

Primary Examiner—Lowell A. Larson
Attorney—Lyon & Lyon

[57] ABSTRACT

A method and apparatus for sizing steel joint rings welded to the ends of cylindrical pipes. A substantially closed integral ring member is used within a joint ring and expanded outwardly thereagainst. A force applying means, such as a hydraulic cylinder, applies a controlled outward force to the ring member which distributes the force in a radially outward direction against the inner circumference of the joint ring for the desired sizing thereof.

22 Claims, 4 Drawing Figures

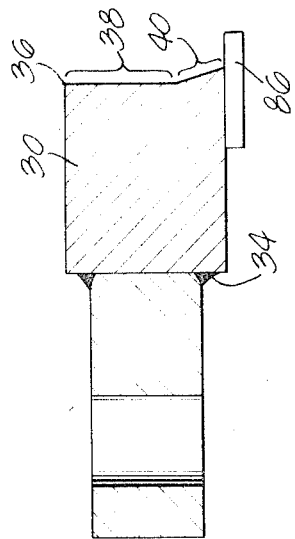
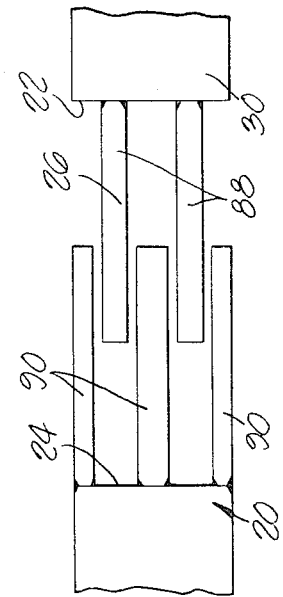
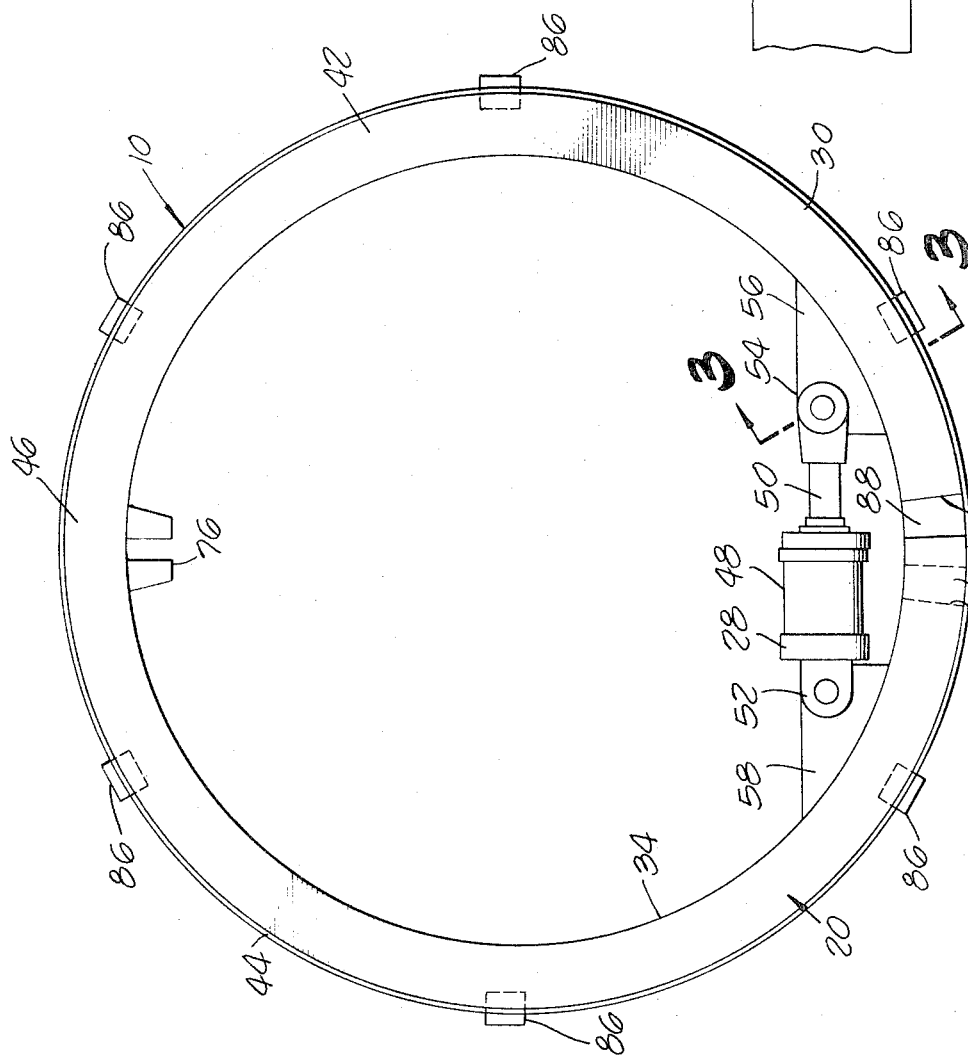

APPARATUS FOR SIZING JOINT RINGS FOR CYLINDRICAL PIPES

This invention relates to a method and apparatus for the expansion of joint rings for cylindrical pipe and more particularly relates to a method of expanding and an expander apparatus which sizes steel joint rings on steel cylinders for use as steel or concrete pipe.

Joint rings generally form the means for connecting adjoining lengths of pipe; each pipe length being provided with a female or bell ring at one end and a male or spigot ring at the other end. The spigot ring is typically provided with an annular external groove which receives a rubber gasket thereby forming a seal when the spigot ring is mated with the bell ring of the adjoining length of pipe. Proper diameter of each joint ring is, of course, critical since it enables a proper fit with the mating joint ring. This proper fit is necessary to insure a fluid-tight seal between adjoining pipes.

In certain types of concrete pipe, for example, steel joint rings are welded to the ends of a steel cylinder, the cylinder serving as a watertight membrane which is subsequently encased on the inside and outside with concrete. A typical concrete pipe assembly is shown generally in U.S. Pat. No. 3,521,644 for Anchor Block Assembly, issued July 28, 1970. The joint rings are manufactured from a length of steel by forming the same into a circle and welding the ends together to produce a ring. Before welding the ring to the steel cylinder, it has been the practice to expand the ring to a predetermined size, usually oversize, by using a segmental expander apparatus. A segmental expander for such joint rings generally is a bulky and expensive piece of equipment typically involving a plurality of segmental dies which are expanded radially outwardly by a central cone or mandrel.

This prior practice of sizing the joint rings has not proved to be entirely satisfactory. While the sizing equipment is theoretically adapted to produce a desired size joint ring, frequently it does not because of worn dies, variations in the physical characteristics (such as stiffness and thickness) of the steel used for the joint rings, and so forth. Another factor involves springback. Even though the joint ring when sized is expanded beyond its "elastic limit", there will be a certain amount of springback.

In addition, changes in the diameter of the rings are experienced after this primary expansion. These changes in diameter of the joint ring are generally attributed to several factors. Normally, after the joint rings have been expanded on the segmental expander they are placed on a rack for storage and transportation to other locations for welding onto the steel cylinders. Oftentimes these locations are a substantial distance from the place of sizing and may involve truck or rail transport thereto. Frequently this handling and hauling results in a change in the joint ring diameter. Such changes are believed to be attributable to numerous factors, such as stress relieving in the joint ring. Furthermore, it has been found that the diameter of the joint ring changes as a result of being welded to the steel cylinder. This change is a function of the amount of weld and the method of application of the weld.

It is evident that with all these contributing factors the diameter variations are neither uniform nor predictable. Thus, steps to compensate for the variations in diameter, such as oversizing the joint rings during the sizing thereof, do not provide a predictable solution. If the joint ring has become too small, then the practice has been to take the welded joint ring-cylinder assembly back to the segmental expander for expansion of the joint ring, or if this is impractical, to mate the assembly with another having an improperly sized joint ring. When the joint ring is found to be too large the customary practice is to apply additional welding about the joint ring in hopes of obtaining uniform shrinkage thereof. Such alternatives involve additional time and labor and are therefore undesirable.

Therefore, it is a primary object of the present invention to provide a new method and apparatus for resizing a joint ring.

Another object of the present invention is to provide a uniform method and apparatus which will suitably correct the problems associated with a diameter variation in a joint ring.

Still another object of the present invention is to provide a method and apparatus for re-expanding and thus resizing joint rings which generally will be accomplished at the location where the joint rings are welded to the steel cylinders.

A still further object of the present invention is to provide a simple and relatively inexpensive apparatus for re-expanding a joint ring.

In accordance with these objects, the present invention generally includes a method which provides for the initial or primary expansion of the joint rings to a diameter selectably undersized from the ultimate proper diameter. Then, a subsequent second or re-expansion of the joint rings is performed which causes the joint rings to be expanded to their ultimate proper dimension after the joint rings are welded onto a steel cylinder. For the re-expansion of the joint rings an apparatus is provided having an integral substantially closed ring member which is adapted to fit within and about the inner circumference of the joint ring. Preferably, a force applying device, such as a hydraulic cylinder, is coupled with the ring member and adapted to apply forces thereto which contract and then expand the ring member causing the ring member to distribute forces radially outward against the joint ring for sizing thereof.

These and further objects and advantages of the present invention will be made readily apparent from the following detailed description and accompanying drawings, wherein:

FIG. 2 is a front view illustrating the integral substantially closed ring member with the hydraulic force means extending laterally thereacross and operably connected thereto.

FIG. 3 is a side sectional view taken substantially along the lines 3—3 of FIG. 2 illustrating a ring member particularly adapted for expansion of a bell joint ring.

FIG. 4 is a top fragmentary view illustrating the interlocking of the separated ends of the ring member.

Figure 1:
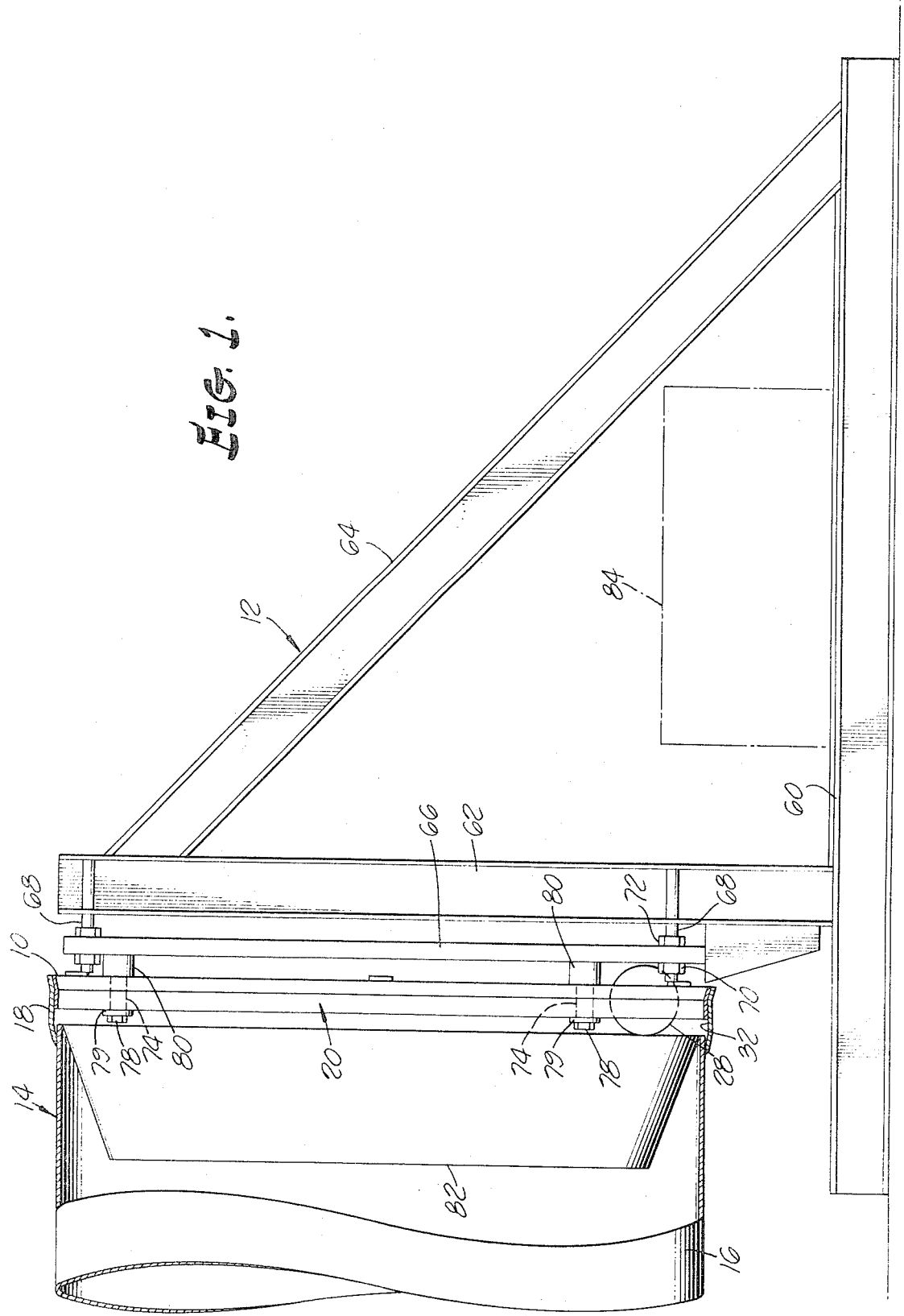
FIG. 1 is a side view of the re-expander apparatus supported by its frame assembly with a bell ring-cylinder assembly partially broken away and positioned for expansion of the joint ring.

Referring now to the drawings, the re-expander apparatus or assembly, designated 10, as seen in FIG. 1 is supported by a frame assembly, designated 12. FIG. 1 also illustrates a typical joint ring-cylinder assembly, generally designated 14, comprising a steel cylinder 16 and a joint ring 18 which is welded to the end of the cylinder 16. As previously indicated, the steel cylinder 16 forms a watertight membrane for the concrete pipe and concrete of predetermined thickness is subsequently applied on both sides of the cylinder 16 during manufacture of the concrete pipe. The joint ring 18, as illustrated, is in the form of a bell ring. The present invention is illustrated in conjunction with a bell ring because it has been found that this type joint ring usually encounters the greatest change in diameter. However, as will be made apparent from the following description, the present invention with slight modification in the peripheral configurations of the resizing member is equally suitable for resizing a spigot ring (not shown) which is welded to the other end of the cylinder 16.

The re-expander assembly 10, as best seen in FIGS. 2 through 4, generally comprises a resizing member in the form of an integral substantially closed C-ring or ring member 20 and its associated components which will be described subsequently. The ends 22 and 24 of the member 20 are separated at 26, and a force element 28 extends laterally across the opening 26, and is operably connected to the member 20. The ring member 20 includes a generally cylindrical section 30 which is interrupted by the opening 26 between the separated ends 22 and 24. The outside diameter of the section 30 is preferably the same as the inner circumference 32 of the desired ultimately sized joint ring 18 for purposes described below. It should also be noted that the ring member 20 can be constructed to include a section 30 of almost any size or shape outside diameter and, thus, the apparatus can be adapted for use with a wide range of different sized joint rings. However, while there is generally no upper limit of the outside diameter of the section 30, it is not felt practical to provide a ring member 20 with a section 30 having an outside diameter of less than approximately 1 foot because of space limitations.

The section 30 defines an annular interior surface 34 and a substantially continuous annular exterior surface 36. The exterior surface 36, as seen best in FIG. 3, includes an axially extending flat portion 38 and an axially extending inclined portion 40. This exterior surface 36 thus conforms generally to the configuration of the inner circumference of a bell ring; however, if the expander were to be used with a spigot ring the exterior annular surface would necessarily be modified to conform generally to the inner circumference of a spigot ring.

The section 30 may also be described generally as comprising a pair of legs 42 and 44 substantially semi-circular in cross-section and integrally joined together at one end along an imaginary plane generally at 46, preferably designated the hinge portion, and separated at the other ends which are diametrically opposite the hinge portion 46 by the opening 26. In this regard, it should be noted that the legs 42 and 44 may be greater in radial thickness at the hinge portion 46 than at the separated ends 22 and 24. In this case, the legs 42 and 44 taper in radial thickness gradually from the hinge portion 46 to the separated ends 22 and 24 thus forming interior and exterior surfaces throughout the ring member 20 which are substantially circular in cross-section but which are non-concentric about a given axis with respect to each other.

The force element 28 is preferably in the form of a double acting hydraulic cylinder having a cylinder housing 48 and a piston rod member 50 which are adapted for relative axial movement therebetween. The cylinder housing 48 includes an internal bore (not shown) in which the piston end (not shown) of the piston rod member 50 moves in response to fluid pressures applied to the ends thereof. The cylinder housing 48 includes at one end thereof an axially extending flange connector 52 and the end of the piston rod member opposite the piston end is similarly provided with a connector 54. These connectors 54 and 52 are received by flanges 56 and 58, respectively, which extend radially inwardly from the interior surface 34 of the section 30 and are integrally joined thereto. Flange member 56 is located proximate the end 22 of the leg 42 and flange 58 is located proximate the end 24 of the leg 44. The hydraulic cylinder 28 thus extends between the flanges 56 and 58 generally adjacent the opening 26 and substantially closer to that opening than to the hinge portion 46. It should also be noted that the axial extension of the hydraulic cylinder 28 and thus the direction of relative movement between the cylinder housing 48 and the piston rod member 50 is substantially perpendicular to a centerline of the ring member 20 extending generally between the opening 26 and the hinge portion 46.

The hydraulic cylinder 28 is a double-acting hydraulic cylinder adapted to provide both a controlled inward force on both legs 42 and 44 thereby contracting the ring member 20 and a controlled outward force on both legs 42 and 44 thereby expanding the ring member 20. The hydraulic cylinder is preferably provided with stops (not shown) to limit both the contraction and expansion of its axial extension across the ring member during the relative axial movement of the piston rod member 50 and the cylinder housing 48.

The dimensions of the ring member 20, as indicated above, together with the size and output of the hydraulic cylinder 28 will vary according to the diameter and thickness of the joint ring to be sized. Generally it has been found that the radial thickness required for the ring member and the output requirements of the hydraulic cylinder can be decreased when larger diameter joint rings are sized. Thus, since the smaller joint rings require a relatively larger hydraulic cylinder, a ring member of less than 12 inches in diameter for all practical purposes leaves insufficient space for the hydraulic cylinder needed.

The re-expander apparatus 10, as shown in FIG. 1, is supported in a vertical position by the frame assembly 12. The frame assembly 12 includes a flat rectangular base 60 comprised generally of interconnecting I-beams, a pair of vertical support members 62, only one of which is shown, which extend upwardly from the base 60, and inclined support members 64, only one of which is seen in the side view, which extend between the upper ends of the vertical support member 62 and one end of the base 60 thereby providing for a rigid support of the vertical support members 62. The vertical supports 62 carry a mounting plate 66 on a plurality of forwardly extending threaded projections 68 which are received by openings (not shown) in each corner of the rectangular mounting plate 66. Securing the mounting plate 66 to each of the projections 68 are a pair of threaded nuts 70 and 72 which are on the front and back sides of the mounting plate, respectively. This connection of the mounting plate 66 with respect to the support members 62 permits adjustment of the mounting plate parallel with the ring member 20 and joint ring to be sized. The mounting plate 66 also includes a plurality of forwardly extending projections 74, preferably three. A bifurcated radially inwardly extending flange 76 is provided on the interior annular surface 34 of the ring member 20 generally at the hinge portion 46 of the ring member and extends on each side of the uppermost projection 74 to support the ring member. A nut 78 and a washer 79 on the forward end of each projection 74 in combination with a spacer 80 adjacent the front side of the mounting plate 66 define an annular space which forms a guide or recess into which the ring member 20 can collapse, and thereby ensure proper centering of the member 20 on the apparatus during collapse and expansion thereof. Also secured to the mounting plate 66, but positioned forwardly of the ring member 20, is a frusto-conical guide 82 for facilitating positioning of the joint ring 18 onto the member 20. Preferably, a hydraulic power unit, designated by the phantom lines 84, is secured to the base 60 with flexible lines (not shown) extending to the hydraulic cylinder 28 for operation thereof.

During a resizing operation of a joint ring, the joint ring-cylinder assembly is positioned in the manner shown in FIG. 1 with inner surface 32 of the joint ring 18 extending concentrically about the exterior surface 36 of the ring member 20. The guide 82 contributes to the proper positioning of the joint ring-cylinder assembly 14, and the guide formed by washers 79 and spacers 80 ensures proper centering of the ring member 20 with respect to the joint ring 18 as noted above.

As seen best in FIGS. 2 and 3, the rear side of the section 30 is provided with circumferentially spaced stops 86 which extend radially beyond the exterior surface 36 of the ring member 20. The end of the joint ring-cylinder assembly 14 abuts these stops thereby axially positioning the joint ring 18 with respect to the ring member 20. Also, as best seen in FIG. 4, the ends 22 and 24 of the ring member 20 are preferably provided with circumferentially extending extensions 88 and 90, respectively. The extensions 88 are axially spaced with respect to the extensions 90 and thereby permit unrestricted movement of the ends 22 and 24 toward each other and apart during contraction and expansion of the ring member 20. The extensions 88 and 90 together bridge the opening 26 between the ends 22 and 24 to provide for an annular exterior surface of the ring member which is continuous about the inner circumference of the joint ring and thereby provides uninterrupted circumferential distribution of an outward force thereto.

In the preferred method of operation, all joint rings when initially or primarily expanded will be expanded beyond their elastic limit to a particular size selectively less than their ultimately desired size and sufficiently less to compensate for any increase in the joint ring beyond its ultimate size. Preferably this primary expansion will elongate the joint ring about 2 ½ percent in circumference and within about 0.010 inch to 0.015 inch smaller than its ultimate desired size. Thus, although all such joint rings so made will require correction after being welded to the cylinder 16, only a small re-expansion will be necessary thereby providing an economical method of controlling joint ring size.

Therefore, in the re-expansion operation of the present invention, since the normal outside diameter of the section 30 of the re-expander apparatus 10 is selectively the same as the inside diameter of the joint ring 18 in its anticipated desired ultimate size, the first step involves a contraction of the ring member 20. Generally, it has been found with any size re-expander apparatus 10 that a contraction of the ring member 20 which results in a reduction of 1 inch in the outside diameter will be sufficient to permit positioning of the joint ring 18 about the ring member 20. Contraction is, of course, achieved through the hydraulic cylinder 28 which pulls inwardly on both legs 42 and 44 which causes a reduction in diameter of the whole peripheral surface 36 without wrinkling of the member 20. After the joint ring 18 and ring member 20 have been properly positioned in the manner heretofore described, the inward force applied by the hydraulic cylinder 28 is released to permit the integral ring member 20 to expand with the peripheral surface 36 moving toward its normal outside diameter. During this expansion of the ring member 20, the exterior surface 36 engages the inner circumference 32 of the joint ring and the ring member 20 distributes a substantially uniform radially outward force throughout the exterior surface 36 against the joint ring for a partial re-expansion and this resizing thereof.

After this partial re-expansion of the joint ring 18 by the resilient force inherent within the ring member 20, an outward force is applied through the hydraulic cylinder 28 to each leg 42 and 44 to cause the legs 42 and 44 to swing generally about the hinge portion 46 and thereby increase the distance between the separated ends 22 and 24. This outward force of the hydraulic cylinder 28 is also distributed in a radially outward direction by the ring member 20 about the entire inner circumference 32 of the joint ring 18 thereby completing the re-expansion and thus resizing of the joint ring. This entire re-expansion operation also expands the joint ring beyond its elastic limit to minimize springback and generally expands the joint ring about 0.15 percent in size.

In a specific example, a C-ring assembly or re-expander apparatus of the present invention was used for the re-expansion and thus resizing of a bell ring welded to the end of an 84 inch diameter cylinder. The joint ring was of ASTM-A283, Grade-C steel three-eighths inches thick and 5 ¼ inches wide with a 30,000 psi minimum yield and a 55,000 to 65,000 psi tensile strength. The particular re-expander apparatus used included a ring member having a section 30 of J45 type steel having a radial thickness of 7 inches at the hinge portion 46 and a radial thickness of 5 inches at the separated ends 26 and with the axial thickness of the ring member being 4 ¼ inches. The hydraulic cylinder was a Miller No. H-84B hydraulic cylinder with a 7 inch bore and 4 inch stroke adapted to develop between 2,500 to 3,000 psi. The hydraulic power unit or pump unit was a Racine hydraulic pump unit including a Racine No. PVB-PSSO-06ER, variable volume vane pump with a 6GPM, 1,000 psi capacity, a 5 horsepower 1,800 rpm, TEFC motor, and a Racine 7 to 1 pressure booster. It was found during the performance of this example that joint rings ranging from 0.010 to 0.100 inches undersize in diameter could be accurately re-expanded to the desired final diameter.

It should be noted that prior to the present invention an expandable ring assembly was used as a support for the end of the cylinder 16 during the welding of the joint ring 18 thereon. This expandable ring assembly was in contact with the inner circumferential surface of the cylinder 16 and provided support for a welding backup copper bar and forced a tight fit between the cylinder and the joint ring to ensure quality welding. It was not used for re-expansion or resizing purposes. Moreover, it was heretofore felt that the use of a C-ring type assembly for re-expansion of a joint ring would be inoperable and that the C-ring assembly would collapse or distort into a non-usable shape during the application of forces thereto generally in the portion of the ring now referred to as the hinge portion. In addition, it was not felt that the strengthening of the C-ring, within practical limits permitting expansion of the C-ring, in this hinge area (where the stresses are generally concentrated) would avoid this collapse. However, the C-ring type re-expander apparatus of the present invention did not collapse. Also, while an increase in cross-sectional area of the ring member 20 at the hinge portion is generally preferably in strengthening the hinge area while allowing weight reduction of the total ring member, such increase is not necessary in all instances and a C-ring assembly having a section 30 of uniform radial and axial thicknesses will also enable re-expansion of certain joint rings without collapse of the ring member.

Moreover, the use of the present invention has produced particularly effective results. No longer is it necessary to haul the joint ring-cylinder assembly back from the welding location to the segmental expander apparatus for resizing. In addition, the correction steps applied to all mis-sized joint rings is the same irrespective of whether there is an increase or decrease in the dimensions of the joint ring thereby providing for an efficient uniform operation. Also the apparatus of the present invention is relatively inexpensive, easy to relocate, and simple to operate.

The use of the present concepts in connection with steel pipe also should be mentioned. This type of pipe is manufactured by forming the cylinder and then integrally forming the ends thereof by flaring or swaging the same to effectively form joint rings. Although relatively less handling of such steel pipe usually is necessary and consequently relatively less size change in the joint rings thereof has been experienced, the concepts of the present invention also are applicable thereto. Additionally, although apparatus shown herein involves the use of a resizing member disposed in a vertical plane, it likewise can be used in a horizontal plane or at any suitable angle. Furthermore, while the present assembly and method has been described generally as a re-expander, and the present invention contemplates that it will preferably be used for the re-expansion and thus resizing of joint rings which have been previously expanded on a segmental expander or swaging die apparatus, it is felt that it may be possible in certain instances, such as with large diameter joint rings, to employ a similar assembly and method for the primary expansion of joint rings.

Having fully described my invention, it is to be understood that I do not wish to be limited to the details herein set forth, but my invention is of the full scope of the appended claims.

I claim:

1. An apparatus for sizing steel joint rings for cylindrical pipe, comprising
    a substantially closed integral ring member interrupted by an opening between adjacent separated ends of said ring member, said ring member defining a generally continuous circular exterior surface, said ring member being adapted to be positioned within a steel joint ring with said exterior surface engaging the inner circumference of the joint ring, said ring member in a normal state being substantially the same in external diameter as the joint ring internal diameter after sizing of said joint ring, and
    force means positioned laterally across said ring member and inward from said ring member and and being operatively affixed to said ring member near each said separated end for applying force laterally across said separated ends of said ring member to contract said ring member for enabling positioning thereof within the joint ring, and for applying force outwardly on said ring member to expand said ring member and return it to its said normal state and thereby cause said ring member to impart forces generally uniformly throughout the inner circumference of the joint ring for the sizing thereof.

2. The apparatus of claim 1, wherein
    said force means comprises a hydraulic cylinder having a piston rod member and a cylinder housing member adapted for relative axial movement therebetween, said piston rod member being operatively connected to said ring member near one of said separated ends, and said cylinder housing member being operatively connected to said ring member near said other separated end.

3. The apparatus of claim 2, wherein said hydraulic cylinder is provided with stop means for limiting its axial outward extension for enabling a predetermined outward diametrical change in the joint ring.

4. The apparatus of claim 1, wherein said separated ends are provided with circumferentially extending axially spaced and interleaved extensions, said extensions bridging said opening between said separated ends to provide a substantially continuous exterior surface for engaging the inner circumference of the joint ring.

5. The apparatus of claim 1, wherein said exterior surface corresponds in shape to an irregular inner circumference of a joint ring.

6. The apparatus of claim 1, wherein one end of said ring member is provided with circumferentially spaced stops extending radially beyond said exterior surface, said stops being adapted to position said ring member axially with respect to a joint ring.

7. A re-expander apparatus, comprising
    a substantially closed integral ring member for imparting forces in an outward direction, said ring member having an axially extending outer surface interrupted by an opening between adjacent separated ends of said ring member, said outer surface of said ring member being circular in a normal state and having an external diameter substantially equal to the prescribed expanded internal diameter of a cylindrical article to be re-expanded, and
    means positioned laterally across said ring member and inward from said ring member and operatively affixed to said ring member near said separated ends for applying force to said ring member to cause said ring member to contract from said normal state for enabling the positioning of said ring member within the cylindrical article to be re-expanded and to cause said ring member to return to its said normal state and impart an outward force to said article.

8. The apparatus of claim 7, wherein said means for applying forces to said ring member comprises a hydraulic cylinder, said hydraulic cylinder providing a controlled application of forces in accurately sizing the member being re-expanded.

9. The apparatus in claim 8, wherein said hydraulic cylinder extends laterally across said ring member substantially prependicular to an imaginary line extending radially from the center of said ring member through said opening adjacent the separated ends of said ring member.

10. The apparatus of claim 8, wherein said hydraulic cylinder includes a bore and a piston member adapted for axial movement within said bore, the size of said bore diameter varying inversely in proportion to the diameter of said ring member.

11. The apparatus in claim 7, wherein the portions of said ring member on the side thereof opposite to said opening are thicker in radial cross-section than at said separated ends.

12. The apparatus of claim 7, wherein said ring memeber is several inches in radial cross-sectional thickness, and wherein said ring member is several inches in axial cross-sectional thickness.

13. The apparatus of claim 7, wherein the overall radial thickness of said ring member varies as an inverse power in proportion to the diameter of said ring member.

14. The apparatus of claim 7, wherein the internal diameter of said ring member is at least 12 inches.

15. A re-expander apparatus for sizing metal joint rings welded to the ends of cylindrical pipe, comprising
   a substantially closed integral ring member interrupted by an opening between adjacent separated ends of said ring member, said ring member having a generally continuous exterior surface, and in a normal state being circular and having an external diameter substantially the same as the internal diameter of a joint ring after sizing of the joint ring,
   means for supporting said ring member and enabling a joint ring to be positioned on said ring member with said exterior surface adjacent to the inner circumference of the joint ring, said means including a rigid frame assembly to which said ring member is connected, and
   hydraulic force means extending laterally across said ring member and inward from said ring member and being operatively affixed to said ring member near each said separated end, said hydraulic force means adapted to be contracted for application of forces to said separated ends for contracting said ring member during the mounting of a joint ring onto said ring member and adapted to be extended for application of forces to said separated ends for expanding said ring member during the sizing of the joint ring to cause said ring member to return to its said normal state and to impart forces substantially uniformly throughout the inner circumference of the joint ring adjacent said exterior surface during the sizing of the joint ring.

16. The apparatus of claim 15, wherein said ring member is adapted to be contracted about 1 inch in diameter.

17. The apparatus of claim 1 including
   support means for supporting said ring member in a substantially vertical plane and radially unconstrained with respect to said ring member, said support means including mutually cooperating projection means and flange means, one of which is secured to said ring member.

18. The apparatus of claim 17 wherein
   the separated ends of said ring member have circumferentially extending interleaved extensions bridging the opening between said separated ends to provide a substantially continuous exterior surface for engaging the inner circumference of the joint ring.

19. The apparatus of claim 7 including
   support means for supporting said ring member in a substantially vertical plane and radially unconstrained with respect to said ring member, said support means including mutually cooperating projection means and flange means, one of which is secured to said ring member.

20. The apparatus of claim 19 wherein
   the separated ends of said ring member have circumferentially extending interleaved extensions bridging the opening between said separated ends to provide a substantially continuous outer surface for engaging the inner circumference of the article to be re-expanded.

21. The apparatus of claim 15 Wherein
   said frame assembly and said ring member have a mutually cooperating projection and flange for supporting said ring member on said frame assembly in a radially unconstrained manner.

22. The apparatus in claim 15 wherein the separated ends of said ring member are provided with circumferentailly extending axially spaced and interleaved extensions, said extensions bridging said opening between said separated ends to provide a substantially continuous exterior surface for engaging the inner circumference of a joint ring.

* * * * *